United States Patent [19]

Miharu et al.

[11] Patent Number: 6,011,115

[45] Date of Patent: *Jan. 4, 2000

[54] THERMOPLASTIC RESIN COMPOSITION AND ITS USE

[75] Inventors: Kenji Miharu; Hitoshi Tachino, both of Chiba-Ken, Japan

[73] Assignee: DuPont-Mitsui Polychemicals Co. Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/849,840

[22] PCT Filed: Dec. 14, 1995

[86] PCT No.: PCT/JP95/02566

§ 371 Date: Sep. 2, 1997

§ 102(e) Date: Sep. 2, 1997

[87] PCT Pub. No.: WO96/18681

PCT Pub. Date: Jun. 20, 1996

[30] Foreign Application Priority Data

Dec. 14, 1994 [JP] Japan ..................................... 6-310239
Sep. 12, 1995 [JP] Japan ..................................... 7-234422
Sep. 12, 1995 [JP] Japan ..................................... 7-234423

[51] Int. Cl.$^7$ .................................................. C08G 63/48
[52] U.S. Cl. ...................... 525/57; 428/34.1; 428/476.3; 524/301; 524/318; 524/503; 525/58
[58] Field of Search ...................... 525/57, 58; 524/301, 524/318, 503; 428/34.1, 476.3

[56] References Cited

U.S. PATENT DOCUMENTS

| | | | |
|---|---|---|---|
| 3,264,272 | 8/1966 | Rees ....................................... | 260/78.5 |
| 3,791,915 | 2/1974 | Goehring et al. .................... | 156/244 X |
| 3,931,449 | 1/1976 | Hirata et al. ............................ | 525/57 |
| 3,975,463 | 8/1976 | Hirata et al. ............................ | 525/57 |
| 4,148,972 | 4/1979 | Yamane et al. ......................... | 428/515 |
| 4,296,019 | 10/1981 | Nelson et al. ....................... | 260/33.4 R |
| 4,321,337 | 3/1982 | Smith ..................................... | 525/329 |
| 4,337,298 | 6/1982 | Karim et al. ........................... | 428/461 |
| 4,404,325 | 9/1983 | Mason et al. ........................... | 525/179 |
| 4,410,595 | 10/1983 | Matsumoto et al. .................... | 428/412 |
| 4,746,704 | 5/1988 | Bergstrom et al. ..................... | 525/301 |
| 5,025,922 | 6/1991 | Havens et al. .......................... | 206/328 |
| 5,061,757 | 10/1991 | Warner .................................. | 525/179 |

FOREIGN PATENT DOCUMENTS

| | | |
|---|---|---|
| 0 403 109 | 12/1990 | European Pat. Off. . |
| 2 355 655 | 1/1978 | France . |
| 49-107 351 | 10/1974 | Japan . |
| B58-000 387 | 1/1983 | Japan . |
| 7761 | 1/1987 | Japan ..................................... 525/57 |
| 175051 | 7/1988 | Japan ..................................... 525/57 |
| 175052 | 7/1988 | Japan ..................................... 525/57 |
| WO88/02764 | 4/1988 | WIPO ..................................... 525/57 |

*Primary Examiner*—Judy M. Reddick
*Attorney, Agent, or Firm*—Patricia L. Kelly

[57] ABSTRACT

A thermoplastic resin composition comprising 50 to 85 parts by weight of an ethylene-vinyl alcohol copolymer, 10 to 40 parts by weight of an ionomer of ethylene-unsaturated carboxylic acid copolymer containing about 5 to 12 mole % of unsaturated carboxylic acid, and 1 to 25 parts by weight of a polyamide and a packaging material comprising said resin composition are provided. The resin composition is excellent in gas barrier property, impact resistance, pinhole resistance, stretchability, drawability and transparency and is preferably used for packaging material.

7 Claims, No Drawings

THERMOPLASTIC RESIN COMPOSITION AND ITS USE

BACKGROUND OF THE INVENTION

1. Field of the Invention

The present invention relates to thermoplastic resin composition with excellent properties such as gas-barrier property, impact resistance, pinhole resistance, stretchability, drawability, and transparency, and also relates to the use of the composition.

2. Description of the Prior Art

Ethylene-vinyl alcohol copolymers with a high vinyl alcohol content are widely used as packaging material for food owing to their superior transparency, gas-barrier property, etc. The Above-mentioned copolymers, however, are rarely used as a mono-layer film since they have insufficient flexibility, processability, stretchability, etc. For example, when these copolymers are molded into film by an inflation process, they have such drawbacks that acceptable molding conditions to obtain satisfactory products from these copolymers are restricted in a narrow range and that longitudinal wrinkles are liable to be formed around pinch rolls. There is another drawback that pinholes are apt to be formed when a film is exposed to repeated deformation such as folding. Such drawbacks can be overcome by blending ethylene polymers, etc., which have excellent flexibility and processability with said copolymer. In many cases, however, addition of ethylene polymers, etc., loses transparency of ethylene-vinyl alcohol copolymers and has not yet been adopted widely.

For example, JP A 40-107351 (1974) discloses that addition of ionomer to ethylene-vinyl alcohol copolymer can improve flexibility. Since this proposal aims at improving adhesiveness of said copolymer to polyolefins, it teaches a technique to add substantial quantities of polyamide as well. This proposal neither considers transparency nor refers to composition of the ionomers.

JP A 50-103582 (1975) discloses an invention which also pays attention to adhesiveness to polyolefins. It discloses laminate containers comprising polyolefins and a composition similar to that in the previous proposal except that the quantity of polyamide blended is smaller. It neither makes consideration on transparency nor discloses use of ionomers in detail although it mentions that zinc ionomer and sodium ionomer can be employed. It only shows examples of using Surlyn 1652 specifically.

According to the investigation of the present inventors, it is revealed that blending of ionomer with ethylene-vinyl alcohol copolymer improves flexibility and processability but deteriorates transparency significantly, and that flexibility and processability are improved but transparency is significantly damaged also in a system in which Surlyn 1652 and polyamide is combined with ethylene-vinyl alcohol copolymer as shown in examples of JP A 50-103582 (1975).

The present inventors then have striven for investigation on composition which overcomes the above-mentioned drawbacks of ethylene-vinyl alcohol copolymer and does not damage transparency so much. As a result, it is revealed that when ionomer of an ethylene-unsaturated carboxylic acid copolymer having high content of unsaturated carboxylic acid component and polyamide are blended at a predetermined ratio, flexibility, processability, impact resistance, tear strength, pinhole resistance, etc., can be improved without sacrificing transparency so much.

SUMMARY OF THE INVENTION

Therefore, it is an object of the present invention to improve drawbacks of ethylene-vinyl alcohol copolymer without damaging its transparency so much.

The present invention relates to thermoplastic resin composition which comprises 50 to 85 parts by weight of an ethylene-vinyl alcohol copolymer, 10 to 40 parts by weight of an ionomer of ethylene-unsaturated carboxylic acid copolymer containing 4 to 15 mol % of unsaturated carboxylic acid, and 1 to 25 parts by weight of a polyamide.

The present invention also relates to packaging material wherein the material has at least one layer of the thermoplastic resin composition mentioned above.

The present invention is specifically characterized by that ionomer with a relatively high unsaturated carboxylic acid content, namely ethylene-unsaturated carboxylic acid copolymer containing 4 to 15 mol % of unsaturated carboxylic acid, is selected and blended, in combination with polyamide, with ethylene-vinyl alcohol copolymer.

That is, the combination of the above-mentioned components can improve flexibility, impact resistance, processability, etc. of ethylene-vinyl alcohol copolymer, without decreasing transparency so much.

It is particularly important that ionomers used in the present invention contain unsaturated carboxylic acid in a range of 4 to 15 mol % in order to maintain superior transparency and to improve impact resistance. When a content of unsaturated carboxylic acid is lower than the above-mentioned range, transparency and impact resistance tend to decrease (refer to Comparative Examples 1 and 2). When a content of unsaturated carboxylic acid is excessively high, impact resistance also tends to be reduced.

Polyamide is used in the present invention to make ethylene-vinyl alcohol copolymer and ionomer compatible each other and therefore, the combination of ionomer and polyamide can improve flexibility, impact resistance, processability, etc., without deteriorating optical properties including transparency.

When only ionomer is blended with ethylene-vinyl alcohol copolymer (refer to Comparative Example 6), transparency and impact resistance fall remarkably compared with that of ethylene-vinyl alcohol copolymer alone. When only polyamide is blended (refer to Comparative Example 7), impact resistance and processability are rarely improved. Their combined addition to ethylene-vinyl alcohol copolymer (refer to Embodiments 1 to 9) can, however, achieve significant improvement of mechanical properties and processability without a noticeable reduction in transparency.

According to the present invention, it is important to use 50 to 85 parts by weight of ethylene-vinyl alcohol copolymer, 10 to 40 parts by weight of ionomer, and 1 to 25 parts by weight of polyamide. When a quantity of ionomer used is below the above-mentioned range (refer to Comparative Example 3), impact resistance and processability are not improved sufficiently. On the other hand, when it exceeds the above-mentioned range (refer to Comparative Example 4), gas-barrier properties are reduced. When polyamide is used in a quantity smaller than the above-mentioned range (refer to Comparative Examples 3 and 6), impact resistance is reduced, and when a quantity of polyamide is higher than the above-mentioned range (refer to Comparative Example 5), the composition thus obtained has such drawbacks that its processability is seriously lowered and its heat-resistance is deteriorated.

Consequently, according to the present invention, addition of specific ionomer and polyamide in predetermined quantities to ethylene-vinyl alcohol copolymer can improve impact resistance, flexibility, processability, pinhole resistance, deep drawability, etc., without sacrificing excellent gas-barrier property, transparency, etc., of the copolymer so much.

Furthermore, in the thermoplastic resin composition of the present invention, a polymer composition obtained by compounding 0.01 to 3 parts by weight of a metal salt of a fatty acid in 100 parts by weight of a resin component composed of 50 to 85 parts by weight of an ethylene-vinyl alcohol copolymer, 10 to 40 parts by weight of an ionomer of ethylene-unsaturated carboxylic acid containing 4 to 15 mole % of an unsaturated carboxylic acid, and 1 to 25 parts by weight of a polyamide has excellent heat stability. Accordingly, a marked advantage is obtained in that in melt molding, the formation of a gel is not recognized, or the resin composition has a defect of coloration at a molding temperature of a relatively high temperature.

PREFERRED EMBODIMENTS OF THE INVENTION

Ethylene-vinyl alcohol copolymer of the present invention contains 40 to 85 mol %, preferably 50 to 75 mol % of vinyl alcohol and may contain the other monomers by about 10 mol % or less. The best method to obtain such copolymers is to sponify ethylene-vinylacetate copolymer containing 40 to 85 mol %, preferably 50 to 75 mol % of vinyl acetate until a saponification value of 95% or higher, preferably 98% or higher is obtained. Vinyl alcohol contents of the copolymer outside of the above-mentioned range are not preferable: When it exceeds the above-mentioned range, heat-resistance and processability become to deteriorate; whereas when it stays below the range, gas-barrier property is reduced. Preferably, ethylene-vinyl alcohol copolymer has a melt flow rate of 0.5 to 50 g/10 min, particularly 1 to 20 g/10 min at 210° C. and under a load of 2.160 g.

Ethylene-unsaturated carboxylic acid copolymers to be converted into ionomers contain 4 to 15 mol %, preferably 5 to 12%, more preferably 6 to 10 mol % of unsaturated carboxylic acid with the consideration on transparency of composition. When the copolymer contains a unsaturated carboxylic acid content lower than the above-mentioned range, it is difficult to obtain composition with superior transparency and impact resistance. Higher contents of unsaturated carboxylic acid of the copolymer tend to improve transparency of composition, but may somewhat decrease impact resistance. Therefore, it is preferable to use copolymers with an acid content in the above-mentioned range. In these copolymers, not higher than 12 mol %, preferably not higher than 8 mol % of other monomers may be co-polymerized. These copolymers can be obtained by undergoing radical copolymerization with ethylene, unsaturated carboxylic acid or some other monomers required at a high temperature and a high pressure.

Unsaturated carboxylic acids include, for example, acrylic acid, methacrylic acid, ethacrylic acid, maleic acid, monomethyl maleate, monoethyl maleate, and maleic anhydride. Acrylic acid and methacrylic acid are particularly prefered. Other monomers which may be contained in ionomer include vinyl ester such as vinyl acetate and vinyl propionate, esters of unsaturated carboxylic acids such as methyl acrylate, ethyl acrylate, 2-ethylhexyl acrylate, methyl methacrylate, isobutyl methacrylate, and diethyl maleate, and carbon monoxide.

Metal ions of ionomer are alkali metals including lithium, sodium and potassium, alkaline earth metals such as calcium and magnesium, and zinc. Zinc is particularly preferred since it produces a good balance of transparency and impact resistance. A neutralization degree of ionomers is in the range of 5 to 100%, preferably 10 to 90%, and more preferably 30 to 70%.

It is preferred to use ionomers having a melt flow rate of 0.05 to 50 g/10 min, particularly 0.5 to 5 g/10 min at 190° C. and under a load of 2,160 g.

Nylon 6, Nylon 66, Nylon 610, Nylon 612, Nylon 11, Nylon 12, Nylon 6/66 copolymer, Nylon 6/12 copolymer, Nylon 66/12 copolymer, Nylon 6/610 copolymer. Nylon 66/610 copolymer, Nylon 6/6T, etc. can be mentioned as polyamides used in the present invention. Polyamides listed above can be employed whatever they are as far as they have enough molecular weight to be able to form film. Among these polyamides, those having a melting point (DSC method) not higher than 240° C., particularly not higher than 230° C. are preferred. Specifically, when melting point of polyamide is too high, processing temperature is also required to be high, thus heat deterioration of composition is very likely to increase. Copolyamide is advantageously used to improve heat-resistance of composition because of its low melting point.

In the present invention, ethylene-vinyl alcohol copolymer is present in 50 to 85 parts by weight, more preferably 60 to 80 parts by weight, ionomer in 10 to 40 parts by weight, preferably 15 to 35 parts by weight, and polyamide in 1 to 25 parts by weight, preferably 3 to 15 parts by weight when a total of ethylene-vinyl alcohol copolymer, ionomer, and polyamide is 100 parts by weight. A ratio of ionomer below the above-mentioned range provides a small degree of improvement in flexibility and pinhole resistance, whereas that beyond the range induces unnegligible deterioration of gas-barrier property. Neither are preferred. Although polyamide functions to make ethylene-vinyl alcohol copolymer and ionomer compatible and to minimize reduction of transparency, its content should not be higher than 25 parts by weight since an excessive quantity of polyamide damages formability of composition.

In the present invention, to further increase the heat stability of the resin composition, it is desirable to compound 0.01 to 3 parts by weight, especially preferably 0.03 to 2 parts by weight, of a metal salt of a fatty acid in 100 parts by weight of a resin component composed of the above ethylene-vinyl alcohol copolymer, the ionomer of the ethylene-unsaturated carboxylic acid copolymer and the polyamide.

The thermal resin composition of this embodiment according to this invention in which a metal salt of a fatty acid is compounded can effectively suppress the elevation of torque at the time of melt kneading.

This elevation of torque may be caused by the occurrence of crosslinking of polymerizable components via thermal degradation (heat degradation or elimination of hydrogen or hydroxyl group) of polymeric components at the time of melt kneading of the resin composition. It is presumed that a metal salt of a fatty acid used in the resin composition of this embodiment of the present invention decreases the friction of polymers with each other and simultaneously shows a heat-stabilizing action, whereby the elevation of torque is suppressed.

As examples of the metal salts of aliphatic fatty acids, it is exemplified metal salt of aliphatic fatty acid having about 12 to 24 carbon atoms, especially about 16 to 20 carbon atoms, and include salts of alkali metals, alkaline earth metals and zinc. More specifically, they include at least one sodium, potassium, calcium, magnesium and zinc palamitate, stearate, oleate, behanate, eruciate and hydroxy stearate. Calcium stearate is most preferably obtained at a low cost, and has a high addition effect.

Composition of the present invention may contain various kinds of additives as required. Such additives include antioxidants, thermal stabilizers, weather-proof stabilizers, antistatic agents, lubricants, and anti-blocking agents. Composition of the present invention may also contain other polymers as far as they do not damage properties of the composition.

Composition of the present invention can be easily obtained by melt-blending components using an ordinary melt-blending apparatus. In order to obtain moldings of composition of the present invention, components are dry-blended or melt-blended, and molded directly. When kneading intensity is insufficient, however, physical properties such as transparency may deteriorate. Therefore, it is preferable to melt-blend composition to form pellets in advance, which are then used for various kinds of molding since it provides moldings with stable properties.

Composition of the present invention can be used for various packaging materials owing to its properties mentioned above. These packaging materials can be molded into film (unoriented film, shrink film, etc.), sheet, cup, tray, bottle, tube, can paper carton and bag-in-box etc. by molding methods such as extrusion molding, injection molding, blow molding, thermoforming (with or without plug-assist), compression molding. Molding temperature varies depending on raw materials used. Preferred temperature, however, is in the range of 190 to 240° C., preferably 200 to 230° C.

The above-mentioned moldings may be composed exclusively of composition of the present invention or may be a laminate of 2 or more layers of other various substrates. Other substrates which may be laminated include, for example, polyolefins such as polyethylene, polypropylene, poly-1-butene, poly-4-methyl-1-pentene, ethylene copolymers such as ethylene-vinyl acetate copolymer, ethylene-(metha)acrylic ester copolymer, ethylene-(metha)acrylic acid copolymer and its ionomer, ethylene-(metha)acrylic acid-(metha)acrylic ester copolymer and its ionomer, and ethylene-(metha)acrylic ester-maleic anhydride copolymer, polyamide, polyester, polyvinyl chloride, polyvinylidene chloride, polystyrene, paper, aluminum foil, and aluminum vapor deposition film. Among these substrates, laminate packaging materials having at least one layer of olefinic polymer such as above mentioned polyolefins and ethylene copolymers are advantageously used. Prior to laminating, olefinic polymer may wholly or partially undergo graft-modification with monomer such as maleic anhydride, which may provide adhesiveness, alternatively, such graft-modified olefinic polymer may be used for adhesive layer and laminated with olefinic polymer which is not graft-modified. Resin composition according to the present invention is advantageously used for an intermediate layer and sandwiched between an inner and outer layer of low hydroscopic resin such as olefinic resin, because this laminated structure will deter a bad influence of an intermediate layer being moistened (deterioration of gas-barrier property by moisture).

More particularly, when composition of the present invention is denoted as C, the above-mentioned olefinic polymer as PO, modified olefinic polymer as modified PO, polymide as PA, polyethylene terephthalate as PET, polystyrene as PS and polyvinyl chloride as PVC, possible laminated structure includes PO/C, PO/modified PO/C, PO/C/PO, PO/modified PO/C/modified PO/PO, PET/C/PET, PS/C/PS, PO/PA/C, PO/C/PA/PO, PO/paper/PO/C/PO.

EXAMPLES

The present invention will be further illustrated by the following examples which will not restrict the range of the present invention.

Firstly, a method of preparing resin composition of the present invention, a film processing method and methods of evaluating film properties will be illustrated below.

(1) Method of Preparing Resin Composition of the Present Invention

Resins with the compositions shown in Tables 1 and 2 were blended according to the blending ratios shown in Table 3. Two blending methods were adopted: Method A is that resin pellets in a solid state were blended uniformly at room temperature using a blender, etc. (refer to as dry blend hereinafter). Method B is that resins were extruded while heated and mixed using a single screw extruder to form pellets (refer to as melt blend hereinafter). Extruder conditions in the melt blend are as follows:

Extruder aperture: 40 mm φ; resin temperature: 230° C.; resin extrusion rate: 10 kg/hr.

(2) Film Processing Method

Each composition blended by the methods mentioned in (1) above was processed by a film machine using an extruder with an aperture of 30 mm or 50 mm. The blown film processing was conducted under the conditions mentioned below:

Machine 1:

Extruder with an aperture of 30 mm, round dye with a diameter of 50 mm

Temperature of resin to be processed: 230° C.

Film thickness: 50 μm

Film blow-up ratio: 2.3

Line speed: 3 m/min

Machine 2:

Extruder with an aperture of 50 mm, round dye with a diameter of 150 mm

Temperature of resin to be processed: 230° C.

Film thickness: 50 μm

Film blow-up ratio: 2.4

Line speed: 6 m/min (3) Methods of Evaluating Film Properties

The properties of films prepared according to the method described in (2) were determined according to respective methods and standards as follows. All the following evaluations were done in 50% relative humidity at 23° C., and the results are shown in Table 3.

| Determination items | Determination method/Standard |
| --- | --- |
| 1) Optical characters | |
| Haze | JIS K-6714 |
| Gloss | JIS Z-8741 |
| Transparency | ASTM D-1709 |
| 2) Oxygen permeability | JIS Z-1707 |
| 3) Film impact | An inverted ball with a diameter of 0.6 inch attached to a tip was knocked at the center of a circular film stretched in a horizontal direction with a constant area and a strength at which the film is ruptured is read. (Apparatus used: Film Impact Tester, Toyo Seiki Co., Ltd.) |
| 4) Pinhole resistance | The number of pinholes is counted when film is bent at a predetermined number of times under conditions of a twist angle of 440° and a stroke of 152.4 m. (Apparatus used: Gelnoflex Measurement Apparatus, Toyo Seiki Co., Ltd.) |

-continued

| Determination items | Determination method/Standard |
| --- | --- |
| 5) Vacuum Deep Drawing Processability | Vacuum Deep Drawing Tester of Omori Kasei Co, Ltd. was used to evaluate melt stretching processability. Film heating duration: 2 seconds; Vacuum drawing duration: 3 seconds; Drawing dept: 60 mm; Film heating temperature: 140° C. |
| 6) Modulus | JIS K6301 A film sample was punched by a JIS No. 1 dumbbell and a stress of longitudinal/transverse direction of film is measured when an elongation percentage is 2% at a tensile rate of 300 mm/min. (Apparatus used: Universal Tester Shimadzu Corporation) |

Example 1, Comparative Example 8

In Example 1, ionomers shown in Table 1 and 2, EVOH, and polyamide were blended at a composition ratio of 21%:70%:9% by weight using the melt blend method mentioned in the resin composition preparation method in (1) to prepare composition, from which film was formed according to the film processing method in (2) (condition of Machine 1). Optical characters (haze, gloss, and transparency), oxygen permeability, film impact, vacuum deep drawing processability, and modulus of the film were measured according to the method of evaluating film properties in (3). In Comparative Example 8, EVOH resin shown in Table was evaluated by the same method. The results are shown in Table 3.

As a result, the resin composition film of Example 1 exhibited similar optical characters and oxygen permeability as EVOH single film in Comparative Example 8, and furthermore, showed significant improvement in film impact, vacuum deep drawing processability, and modula (flexibility).

Examples 2 and 4

Examples 2 and 4 were completely the same as Examples 1 and 3, respectively, except that the resin compositions were prepared by the dry blend method. Although film impact, oxygen permeability, vacuum deep drawing processability, and modulus exhibited similar improving tendencies of Example 1, optical characters were slightly worse than that prepared by the melt blend method.

Examples 3, and 5 and Comparative Examples 1, 2 and 10

Evaluation was conducted using the same method as in Example 1, except that ionomers of composition were changed to those shown in Table 3. In Examples 3, and 5, respective items were improved at the level similar to that obtained in Example 1. Optical characters or film impact were, however, worse in Comparative Examples 1, 2, and 10.

Example 6

All the matters were the same as Example 1, except for alteration of resin composition ratios.

Comparative Examples 3 to 5

Resin composition ratios were changed to those shown in Table 3 and the same evaluation method as in Example 1 was conducted.

When quantities of ionomer and polyamide blended were too small to EVOH, melt stretchability and film impact were decreased as in Comparative Example 3. On the other hand, when ratios of ionomer and polyamide incorporated were excessively high, film molding property was reduced or film became improcessable as shown in Comparative Example 5, and higher ratios of ionomer and polyamide significantly increased oxygen permeability and provided unfavorable results as shown in Comparative Example 4.

Comparative Example 6

Polyamide was excluded from a resin composition and a two-component composition consisting of EVOH and ionomer was prepared. As a result, optical characters and film impact were remarkably reduced, leading to unfavorable outcome.

Comparative Example 7

Ionomer was excluded from a composition and a two-component composition consisting of EVOH and polyamide was prepared. As a result, film impact was reduced, vacuum deep drawing processability was lost, and modulus became higher than that of EVOH.

Example 7

Resin Composition identical to that of Example 1 was molded into film using a blown film machine with an extruder aperture of 50 mm according to the film processing method (Machine 2) described in (2). When an extruder became larger units scale, properties of the film remained at the same levels as in Example 1. Thus, excellent blown film processability and properties were observed.

Example 8

Resin composition identical to that in Example 2 was processed by the film processing method identical to that is Example 7. When an extruder became larger in its scale, properties of the film remained at the same levels as in Example 2. Thus, excellent blown film processability and properties were observed.

Comparative Example 9

For comparison, the EVOH resin shown in Table 2 was molded into film by the film processing method identical to that in Example 7 and properties of the film were evaluated.

In Examples 7 and 8 and Comparative Example 9, pinhole resistance was determined according to the method described in the methods of evaluating film properties in (3). As a result, the number of bending until pinholes appeared was significantly increased and an improvement of pinhole resistance was confirmed in Examples 8 and 9 as compared with Comparative Example 9.

Example 9

Resin composition film was prepared using the same method as in Example 1, except that 6-Ny in Example 1 was changed for 6, 12-Ny (UBE). The employment of 6, 12-Ny (UBE), which has a lower melting point than 6-Ny, allowed the resin temperature in melt blending and film processing to be lowered from 230° C. to 210° C. without increasing the resin pressure and motor loading of extruder. This effectively serves to reduce heat deterioration as well as cross-linking during a long-term operation of molding resin composition.

Optical characters, oxygen permeability, film impact, pinhole resistance and vacuum deep drawing processability of thus obtained film were measured according to the method of evaluating film properties in (3). As a result, the resin composition film of Example 10 exhibited similar oxygen permeability to EVOH single film in Comparative Example 8 and significant improvements in film impact, pinhole resistance and vacuum deep drawing processability as shown in Table 4.

Example 10

Resin composition film was prepared using the same method as in Example 1, except that 6-Ny in example 1 was changed for 6, 12-Ny (EMS). Thus obtained film was evaluated according to the method of evaluating film properties in (3). As a result, as shown in Table 4, the resin composition film of Example 10 exhibited similar oxygen permeability to EVOH single film in Comparative Example 8 and significant improvements in film impact, pinhole resistance and vacuum deep drawing processability.

Examples 11 and 12

Three-layer cast film (55 μm thickness of a laminate film whose layers are in the ratio of 15/10/30) consisting of an outer layer of EVOH resin composition prepared as in Example 1, and intermediate layer of maleic anhydride modified polyolefin resin (Admer NF520 manufactured by Mitsui Petrochemical Industries, Ltd.) and an inner layer of resin listed in Table 5 was formed on the molding conditions described in Table 5 using a multilayer co-extrusion molding method.

Optical characters and oxygen permeasbility of thus obtained films were measured according to the method of evaluating film properties in (3). The results are shown in Table 5. As a result, it was confirmed that EVOH resin composition according to the present invention can be formed into multilayer film using a normal molding method, the same way as EVOH, and that the multilayer films exhibit the same good optical characters and oxygen permeability as single film (Example 1).

TABLE 1

Ionomer Resin Materials Used in Examples and Comparative Examples

| Ionomer resin No. | Copolymer | MAA content (mol %) | Ion | Neutralization value (%) | MER (g/10 min) |
|---|---|---|---|---|---|
| IO-1 | Ethylene-methacrylic acid (MAA) copolymer | 7.5 | Zn | 40 | 0.9 |
| IO-2 | Ethylene-methacrylic acid (MAA) copolymer | 5.3 | Zn | 59 | 0.7 |
| IO-3 | Ethylene-methacrylic acid (MAA) copolymer | 4.3 | Zn | 36 | 1.5 |
| IO-4 | Ethylene-methacrylic acid (MAA) copolymer | 3.1 | Zn | 30 | 0.8 |
| IO-5 | Ethylene-methacrylic acid (MAA) copolymer | 6.7 | Na | 36 | 2.1 |
| IO-6 | Ethylene-methacrylic acid (MAA) copolymer | 3.1 | — | 0 | 1.5 |
| IO-7 | Ethylene-methacrylic acid (MAA) copolymer | 3.5 | Na | 50 | 1.3 |

TABLE 2

Ethylene-Vinyl Alcohol Copolymer Resin (EVOH) and Polyamide Resin Materials Used in Examples and Comparative Examples

| | Monomer | Melting point (° C.) | Density (g/cm$^2$) | Commercial name |
|---|---|---|---|---|
| Ethylene-vinyl alcohol copolymer (EVOH) | Ethylene: 32 mol % Vinyl alcohol: 68 mol % | 181 | 1.19 | Kuraray Eval EP F101A Manufactured by Kuraray Co., Ltd. |
| Nylon 6 (6-Ny) | -Caprolactam | 225 | 1.14 | Amilan OM1010T Manufactured by Toray Industries, Inc. |
| Nylon 6,12 copolymer (6, 12-Ny (UBE)) | -Caprolactam: 80 wt % aminododecanoic acid: 20 wt % | 199–203 | | UBE Nylon 7024B Manufactured by Ube Industries, Ltd. |
| Nylon 6,12 copolymer (6, 12-Ny (EMS)) | -Caprolactam: 90 wt % aminododecanoic acid: 10 wt % | 200 | | Grilon CF 9 6361 Manufactured by EMS |

TABLE 3

Physical Properties of Film with Various Compositions

| | Weight ratio of composition | Preparation method | Machine | Optical characters (%) haze | gloss | transparency | Oxygen permeability cc/m² hr atm | Film impact (N/cm) | Pinhole resistance (number of bending to cause pinhole) | Deep drawing processability | Modulus (MPa) longitudinal transverse |
|---|---|---|---|---|---|---|---|---|---|---|---|
| Ex. 1 | EVOH/6-Ny/IO-1 = 70/9/21 | Melt blend | 1 | 11 | 91 | 69 | 0.081 | 20,000 | | good | 35/35 |
| Ex. 2 | EVOH/6-Ny/IO-1 = 70/9/21 | Dry blend | 1 | 12 | 87 | 47 | | 18,300 | | | 37/35 |
| Ex. 3 | EVOH/6-Ny/IO-2 = 70/9/21 | Melt blend | 1 | 20 | 75 | 41 | | 22,000 | | | 37/37 |
| Ex. 4 | EVOH/6-Ny/IO-2 = 70/9/21 | Dry blend | 1 | 24 | 66 | 37 | | 23,400 | | | |
| C. Ex. 10 | EVOH/6-Ny/IO-3 = 70/9/21 | Melt blend | 1 | 28 | 47 | 28 | | 27,400 | | | 35/36 |
| Ex. 5 | EVOH/6-Ny/IO-5 = 70/9/21 | Melt blend | 1 | 22 | 62 | 46 | | 20,800 | | | 42/39 |
| C. Ex. 1 | EVOH/6-Ny/IO-4 = 70/9/21 | Melt blend | 1 | 28 | 22 | 6 | | 8,300 | | | 37/36 |
| C. Ex. 2 | EVOH/6-Ny/IO-6 = 70/9/21 | Melt blend | 1 | 29 | 44 | 22 | | 10,500 | | | 37/36 |
| Ex. 6 | EVOH/6-Ny/IO-1 = 80/6/14 | Melt blend | 1 | 11 | 88 | 79 | 0.064 | 15,000 | | good | 39/40 |
| C. Ex. 3 | EVOH/6-Ny/IO-1 = 90/3/7 | Melt blend | 1 | 12 | 77 | 75 | 0.14 | 8,000 | | bad | 42/42 |
| C. Ex. 4 | EVOH/6-Ny/IO-1 = 30/21/49 | Melt blend | 1 | 12 | 25 | 30 | 33 | 16,000 | | good | |
| C. Ex. 5 | EVOH/6-Ny/IO-1 = 60/30/10 | Melt blend | 1, not able to process | — | — | — | — | — | — | | |
| C. Ex. 6 | EVOH/IO-1 = 70/30 | Melt blend | 1 | 40 | 8 | 1 | 0.067 | 1,900 | | good | |
| C. Ex. 7 | EVOH 6-Ny = 90/IO | Melt blend | 1 | 5 | 91 | 82 | — | 7,100 | | not able to process | 54/53 |
| C. Ex. 8 | EVOH | — | 1 | 4 | 136 | 84 | 0.12 | 8,000 | | not able to process | 49/52 |
| Ex. 7 | EVOH/6-Ny/IO-1 = 70/9/21 | Melt blend | 2 | 13 | 86 | 65 | — | 18,100 | 50 | | — |
| Ex. 8 | EVOH/6-Ny/IO-2 = 70/9/21 | Melt blend | 2 | 18 | 74 | 44 | — | 18,900 | 50 | | — |
| C. Ex. 9 | EVOH | — | 2 | 8 | 96 | 81 | — | 5,900 | 5 | | — |

Ex: Example
C. Ex: Comparative Example

TABLE 4

| | Example 9 | Example 10 |
|---|---|---|
| Weight ratio of composition | EVOH/6.12-Ny (UBE)/ IO-1 = 70/9/21 | EVOH/6.12-Ny (EMS)/ IO-1 = 70/9/21 |
| Preparation method | Melt blend | Melt blend |
| Machine | 1 | 1 |
| Optical character(%):haze | 11 | 15 |
| gloss | 51 | 37 |
| transparency | 66 | 40 |

TABLE 4-continued

| | Example 9 | Example 10 |
|---|---|---|
| Oxygen permeability (cc/m²-nr-atm) | 0.03 | 0.03 |
| Film impact (N/cm) | 38,200 | 13,600 |
| Pinhole resistance (number of bending to case pinholes) | >50 | >50 |
| Deep drawing processability | good | good |

TABLE 5

| | | Resin temperature (° C.)ᵃ⁾ | | | Optical characters (%) | | | Oxygen permeability (cc/m² hr atm) |
|---|---|---|---|---|---|---|---|---|
| | Inner resin | outer resin | intermediate resin | inner resin | haze | gloss | transparency | |
| Example 11 | Ionomer (IO-7) | 248 | 220 | 243 | 9 | 35 | 17 | 0.05 |

TABLE 5-continued

| | Resin temperature (° C.)[a] | | | Optical characters (%) | | | Oxygen permeability |
|---|---|---|---|---|---|---|---|
| | Inner resin | outer resin | intermediate resin | inner resin | haze | gloss | trans- parency | (cc/m² hr atm) |
| Example 12 | L-L DPE[b] | 248 | 210 | 52 | 5 | 75 | 41 | 0.04 |

[a] Aperture of extruder cylinder: for outer/intermediate/inner resin = 50/50/65 mmØ, T-die 500 mm width, coat hanger die
[b] Liner-low density polyethylene (Ultzex 2021L manufactured by Mitsui Petrochemical Industries, Ltd.)

Examples 13 to 16 and Referential Example 1

As starting materials, the materials shown in Table 6 were used.

TABLE 6

| Starting material | Contents | Maker and trademark |
|---|---|---|
| EVOH | Ethylene-vinyl alcohol (composition: 32/68 mol %) | Kuraray Inc.; Eval EP P-101A |
| Ionomer | 40 mol % zinc neutral salt of ethylene-methacrylic acid (composition: 80/20%) random copolymer | Mitsui-Dupont Polychemical Co., Ltd.; Himilan |
| Nylon | Nylon 6/12 (composition: epsilon-caprolactum 80 wt. %/ aminododecanoic acid 20 wt. %) copolymer | Ube Industries Co., Ltd.; 7024B |
| Calcium stearate | — | Asahi Denka Co., Ltd.; calcium stearate CS-F |
| Anti-oxidant | | Ciba Geigy; Irganox 1010 |

The ethylene-vinyl alcohol copolymer (EVOH), the ionomer of ethylene-methacrylic acid random copolymer, nylon, calcium strarate, and the anti-oxidant as shown in Table 6 were added to a Laboplastomill (100 ml in amount) in volume shown in Table 7. Under an atmosphere of nitrogen, they were kneaded at a block temperature of 240° c. and with a rotor turning at 60 rpm for 60 minutes. By examining the variations of the torque with time, the heat stability of the resin composition was evaluated.

The results are described in Table 7. It is presumed that calcium stearate has an effect of suppressing the heat-crosslinking or heat degradation of the resin composition, and that the heat stability of the resin composition is improved. In comparison with Referential Example 1 in which calcium stearate was not added. Examples 13 to 16 in which calcium stearate were added in an amount of 0.1 to 1.0 parts by weight show the extremely decreased values of the elevation of torque.

TABLE 7

| Compounding (parts by weight) | Examples | | | | Ref. Example 1 |
|---|---|---|---|---|---|
| | 13 | 14 | 15 | 16 | |
| EVOH | 70 | 70 | 70 | 70 | 70 |
| Ionomer | 21 | 21 | 21 | 21 | 21 |
| Nylon | 9 | 9 | 9 | 9 | 9 |
| Calcium stearate | 0.1 | 0.3 | 1.0 | 0.1 | — |
| Anti-oxidant | — | — | — | 0.1 | — |
| Variations with time of torque (kg.m) | | | | | |
| after 15 min. | 2.1 | 1.8 | 1.8 | 2.0 | 2.3 |
| after 30 min. | 2.3 | 2.1 | 2.1 | 2.2 | 2.9 |
| after 45 min. | 2.7 | 2.5 | 2.4 | 2.5 | 3.8 |
| after 60 min. | 3.1 | 3.0 | 2.9 | 3.0 | 4.4 |

According to the present invention, addition of predetermined quantities of specific ionomer and polyamide with ethylene-vinyl alcohol copolymer can improve impact resistance, flexibility, processability, pin-hole resistance, deep-drawing property, etc., without damaging excellent gas-barrier property, transparency, etc., of said copolymer so much Composition of the present invention can be molded, by making best use of these properties, into film, sheet, container, etc., by various molding methods such as extrusion molding, injection molding, blow molding, vacuum forming and pressure forming.

What is claimed is:

1. A thermoplastic resin composition consisting essentially of:

a) 50 to 85 parts by weight ethylene vinyl alcohol copolymer;

b) 10 to 40 parts by weight of an ionomer of ethylene-carboxylic acid copolymer, said ionomer is an ionomer neutralized with a member selected from the group consisting of zinc, an alkali metal, and an alkaline-earth metal, and the degree of neutralization is 10 to 90%; and c) 1 to 25 parts by weight of a polyamide;

wherein said carboxylic acid is present in said ionomer at a level of 5 to 12 mole % of said ionomer.

2. The thermoplastic resin composition of claim 1, wherein said ionomer is an ionomer neutralized with zinc.

3. The thermoplastic resin composition of claim 1, wherein the ethylene vinyl alcohol copolymer contains 40 to 85 mole % vinyl alcohol.

4. The thermoplastic resin composition of claim 1, wherein the polyamide is a polyamide or a copolyamide having a melting point of less than 240° C.

5. The thermoplastic resin composition of claim 1, wherein the thermoplastic resin composition further comprises a fatty acid metal salt in an amount of 0.01 to 3 parts by weight per 100 parts by weight resin.

6. A packaging film wherein said film has at least one layer of a thermoplastic resin composition consisting essentially of:

a) 50 to 85 parts by weight ethylene vinyl alcohol copolymer;

b) 10 to 40 parts by weight of an ionomer of ethylene carboxylic acid copolymer, said ionomer is an ionomer neutralized with a member selected from the group consisting of zinc, an alkali metal, and an alkaline-earth metal, and the degree of neutralization is 10 to 90%; and c) 1 to 25 parts by weight of a polyamide;

wherein said carboxylic acid is present in said ionomer at a level of 5 to 12 mole % of said ionomer.

7. The packaging film of claim 6, further comprising at least one layer of an olefin polymer.

* * * * *